US008532483B2

(12) United States Patent
Rosner et al.

(10) Patent No.: US 8,532,483 B2
(45) Date of Patent: Sep. 10, 2013

(54) METHOD TO DIAGNOSE AN OPTICAL COMMUNICATION NETWORK

(75) Inventors: Soenke Rosner, Unterhaching (DE); Thomas Treyer, München (DE)

(73) Assignee: Adtran GmbH, Berlin-Siemensstadt (DE)

( * ) Notice: Subject to any disclaimer, the term of this patent is extended or adjusted under 35 U.S.C. 154(b) by 458 days.

(21) Appl. No.: 12/739,788

(22) PCT Filed: Oct. 22, 2008

(86) PCT No.: PCT/EP2008/064285
§ 371 (c)(1),
(2), (4) Date: Sep. 1, 2010

(87) PCT Pub. No.: WO2009/053390
PCT Pub. Date: Apr. 30, 2009

(65) Prior Publication Data
US 2011/0008040 A1    Jan. 13, 2011

(30) Foreign Application Priority Data

Oct. 26, 2007    (EP) .................................... 07021033

(51) Int. Cl.
*H04B 10/08*    (2006.01)
(52) U.S. Cl.
USPC .................. 398/17; 398/10; 398/22; 398/23
(58) Field of Classification Search
USPC ................................ 398/9, 25, 36, 17, 22–24
See application file for complete search history.

(56) References Cited

U.S. PATENT DOCUMENTS 5,760,940 A * 6/1998 Frigo ............................... 398/38
7,437,076 B2  10/2008 Song et al.
8,050,554 B2 * 11/2011 Jang et al. ....................... 398/13
(Continued)

FOREIGN PATENT DOCUMENTS

CN  1852057 A   10/2006
CN  101043272 A  9/2007
(Continued)

OTHER PUBLICATIONS

Structure. (2000). In Collins English Dictionary. Retrieved from http://www.credoreference.com/entry/hcengdict/structure.*

(Continued)

*Primary Examiner* — Nathan Curs
*Assistant Examiner* — Tanya Ngo
(74) *Attorney, Agent, or Firm* — Laurence A. Greenberg; Werner H. Stemer; Ralph E. Locher

(57) ABSTRACT

A method for diagnosing an optical communication network having a control system, an optical hub, and multiple optical network terminators. The hub communicates with all the network terminators via an inband management channel. In case one network terminator disturbs the communication from the network terminators to the hub and the communication from the hub to the network terminators is functional, the control system sends a shut-off command to one network terminator, checks if the disturbance is gone, if the disturbance is not gone, sends a pulse mode activation command to this network terminator, checks if there is a superposition signal of the disturbance signal with a pulse mode signal and marks the network terminator as bad, if the pulse signal is not superimposed.

10 Claims, 2 Drawing Sheets

(56) References Cited

U.S. PATENT DOCUMENTS

| | | | |
|---|---|---|---|
| 8,224,181 B2* | 7/2012 | Rohde et al. | 398/15 |
| 2002/0027688 A1* | 3/2002 | Stephenson | 359/152 |
| 2003/0170032 A1 | 9/2003 | Song et al. | |
| 2004/0247057 A1* | 12/2004 | Park et al. | 375/345 |
| 2006/0093356 A1* | 5/2006 | Vereen et al. | 398/33 |
| 2007/0274719 A1* | 11/2007 | Ferguson et al. | 398/66 |
| 2008/0279554 A1* | 11/2008 | Kazawa et al. | 398/69 |
| 2009/0238564 A1* | 9/2009 | Rohde et al. | 398/45 |
| 2011/0008040 A1* | 1/2011 | Rosner et al. | 398/17 |
| 2011/0069955 A1* | 3/2011 | Hajduczenia et al. | 398/45 |

FOREIGN PATENT DOCUMENTS

| | | |
|---|---|---|
| EP | 1 345 468 A2 | 9/2003 |
| EP | 1 906 563 A1 | 4/2008 |
| JP | 2006 174270 A | 6/2006 |
| JP | 2009534888 A | 9/2009 |
| JP | 2009539290 A | 11/2009 |
| JP | 2010539836 A | 12/2010 |

OTHER PUBLICATIONS

Listing. (2000). In Collins English Dictionary. Retrieved from http://www.credoreference.com/entry/hcengdict/listing.*

* cited by examiner

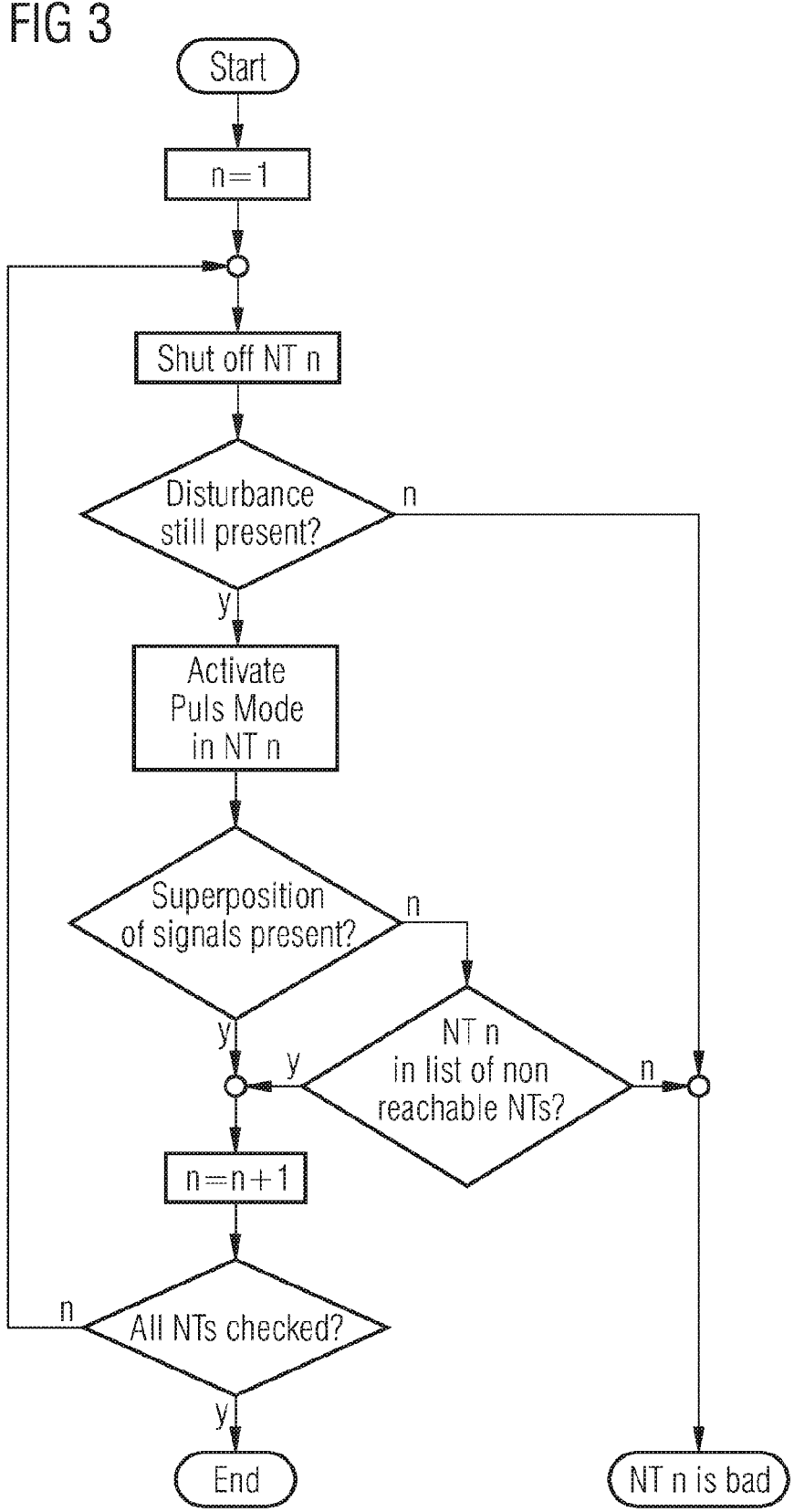

METHOD TO DIAGNOSE AN OPTICAL COMMUNICATION NETWORK

BACKGROUND OF THE INVENTION

Field of the Invention

The invention is related to a method to diagnose an optical communication network comprising a control system, an optical hub and multiple optical network terminators, where the hub communicates with all the network terminators via an inband management channel.

In an optical communication network all network terminators are connected to an optical hub, where the connections from the hub to the network terminators are routed via one or more passive optical splitters. The directions of transmission are separated by different wavelengths of the optical signal.

By this topology all information from the hub is always sent simultaneously to the network terminators. In the opposite direction, from the network terminators to the hub, the information is transmitted in allocated time slots. Management information of the network is transferred via an inband management channel.

In a fault condition or by manipulation an optical network terminator can send a continuous signal or a disturbing signal, so that all allocated timeslots are disturbed and no network terminator in this optical network is able to transmit information to the hub.

As all network terminators are connected to one optical hub, the one bad network terminator, producing the disturbance, can not automatically be recognised and localised.

Due to the split of the transmission directions by different optical wavelengths, the network terminators can be reached by the hub, but through the disturbance of all timeslots in the direction from the network terminators to the hub no information for identifying the disturber or the functioning network terminators can be transmitted.

Up to now the localisation of a disturbing network terminator in an optical communication network could only be done by the stepwise disconnection of the point-to-point connections from the splitter to a particular network terminator. Therefore a technician has to disconnect separately and one after the other each optical connection from a splitter to the network terminator and in the path from the hub to the network terminator there can be more than one splitter. With every disconnection it has to be checked at the control system if the disturbed signal is still present or not.

This method is even more burdened by the fact that the splitters are not near to the control system. So another form of communication is necessary between the locations. The splitters are often hard to access, since a lot are mounted in cabinets on the floor or in cabinets/closures in the earth.

Splitters are designed to handle up to 128 connections. So such a number of network terminators can be connected to a splitter and so the tests are very time consuming. During the whole test procedure all the subscribers to the disturbed optical communication network do not have any service.

It is the goal of the invention to propose a method to find a bad network terminator in an optical communication network, which disturbs the communication between the hub and the network terminators without manually disconnecting the optical connections.

This goal is achieved by the features of the independent claim(s).

Embodiments of the invention are shown in the dependent claims.

BRIEF DESCRIPTION OF THE DRAWINGS

FIG. 3 is a block diagram showing a method in accordance with one particular embodiment of the invention.

DESCRIPTION OF THE INVENTION

Figure 1:
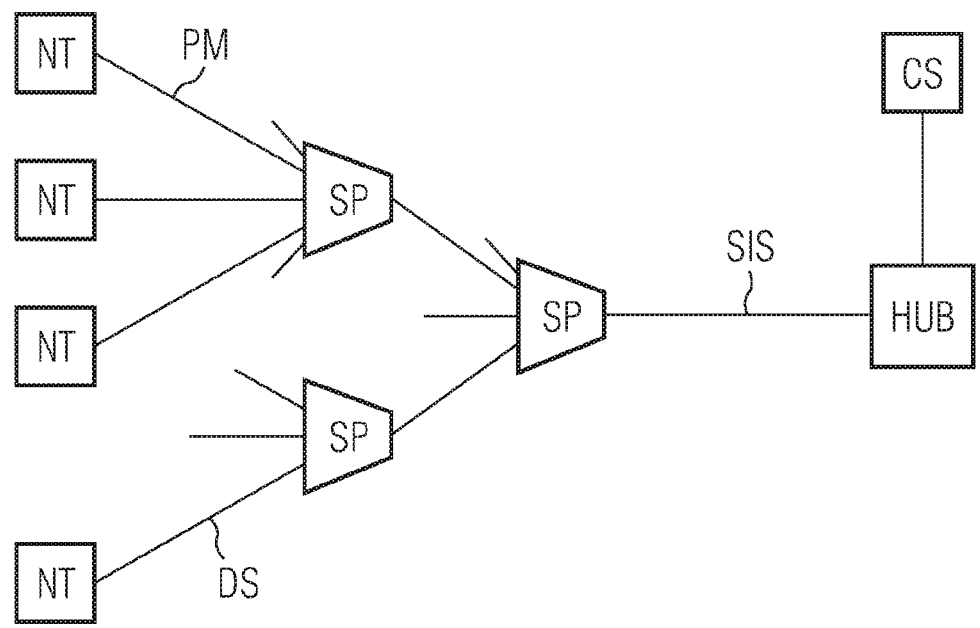
FIG. 1 is a diagram illustrating an optical network in tree configuration.

The optical network in a tree configuration is shown in FIG. 1 and comprises a network hub HUB, a lot of network terminators NT and optical splitters SP, which connect the network terminators NT to the hub HUB over the optical lines. The optical network is controlled and maintained by a control system CS, in which its structure is mapped. The control system CS can be part of the hub HUB or can be a separate device, located at a convenient place.

The directions of communication are splitted by different wavelengths. In the direction from the hub to the network terminators all network terminators get the same signal, in the direction from the network terminators to the hub, each network terminator is allocated to a time slot on the optical lines.

The operation and maintenance commands are transmitted via an inband management channel from the control system.

Each network terminator is registered in the hub and in the control system in status lists and there exists also a list of non reachable network terminators. These can be non reachable due to broken optical lines, power supply faults etc.

If a disturbance signal is recognised by the hub, which corrupts the transmit signals of all the network terminators, a method to diagnose the network is started in the control system or in the hub. If the commands in the inband management channel are still carried out by the network terminators, one network terminator after the other can be deactivated and checked, if the disturbance is still present.

If the commands in the inband management channel are no more carried out by the network terminators, a method to detect the network terminator, which transmits a disturbance signal, is used.

This method uses a low frequency pulse mode signal which is sent by a network terminator an which is superimposed to the disturbance signal. Therefore a shut off command and afterwards a pulse mode command is sent to each network terminator. This is possible, as the directions of communication are split by wavelengths and only the direction to the hub is disturbed.

Figure 2:
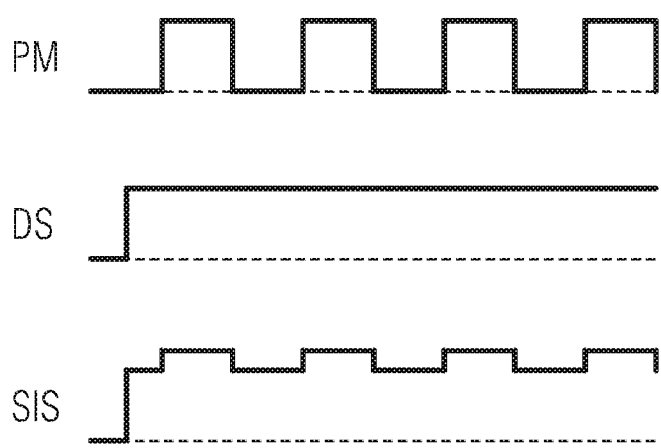
FIG. 2 shows a low frequency signal PM, a disturbance signal DS and a superimposed signal SIS produced in one particular mode of the invention.

In the pulse mode the network terminator sends a low frequency signal PM, which is superimposed to the disturbance Signal DS and produces the superimposed signal SIS, as shown in FIG. 2.

The optical receiver in the hub uses automatic gain control to adapt the receiver to different signal strengths due to the different distances of the connected network terminators. The gain control signal in the receiver is used to measure the signal strength. If the signal strength varies in low frequency, due to the superimposed signals, this can be detected by means of the gain control signal.

A low frequency signal is chosen to distinguish it from normal data signals. A frequency of 1 to 2 Hz is suitable. Filtering of such a signal is easy.

The received signal will be analyzed by the hub and if the pulse mode signal is present, it will be detected. If it is not present, the bad network terminator is found.

The method is shown in more detail in FIG. 3.

If the method of diagnosis is entered, a counter of the network terminators is initialised to 1.

A shut off command is sent to the addressed network terminator. It is checked, if the disturbance signal is still present. If the disturbance has gone, the bad network terminator is found.

If the disturbance is still present, the pulse mode is activated in the network terminator. Now it is checked in the hub, if the superimposed signal is present.

If the superimposed signal is not present, this network terminator is looked up in the list of not reachable network terminators. If it is not registered there, the bad network terminator is found. If it is registered there or the superimposed signal is still present the next network terminator is checked with this method. This is done until all network terminators are tested.

The result of the tests shall deliver the bad network terminator.

The bad network terminator is shown in the control system together with the according path in the optical network.

Now it is easy to disconnect the bad network terminator at the last splitter or to exchange it, whatever can be done.

REFERENCES

CS Control System
DS Disturbance Signal
HUB Optical Network Hub
NT Network Terminator
PM Pulse Mode Signal
SIS Superimposed Signal
SP Optical Splitter

The invention claimed is:

1. A method for diagnosing an optical communication network, the network including a control system, an optical hub, and a plurality of optical network terminators, wherein the optical hub communicates with the network terminators via an inband management channel and wherein, if one of the network terminators disturbs a communication from the network terminators to the hub and the communication from the hub to the network terminators is functional, the control system sends a shut-off command from the control system to one network terminator and checks whether or not the disturbance is gone, the method comprising:

if the disturbance is not gone, with the control system:
 sending a pulse mode activation command from the control system to a given network terminator;
 checking whether there is a superposition signal of the disturbance signal with a pulse mode signal; and
 if the pulse signal is not superimposed, marking the given network terminator as bad.

2. The method according to claim 1, wherein the pulse mode signal is a low frequency signal.

3. The method according to claim 2, wherein the pulse mode signal has a frequency of 1 to 2 Hz.

4. The method according to claim 2, which comprises receiving the superposition signal with an optical receiver having automatic gain control, and using the gain control signal to detect the portion of the pulse mode signal.

5. The method according to claim 1, which comprises comparing the marked network terminator to entries in a list of non reachable network terminators.

6. The method according to claim 1, wherein the optical communication network includes passive splitters.

7. The method according to claim 1, which comprises mapping the structure of the optical communication network in the control system.

8. The method according to claim 7, which comprises displaying the path from the hub to the bad network terminator in the control system.

9. The method according to claim 8, which comprises disconnecting the path to the bad network terminator at the last splitter.

10. The method according to claim 8, which comprises locking or exchanging the bad network terminator.

* * * * *